United States Patent [19]

Hattori

[11] Patent Number: 4,755,039
[45] Date of Patent: Jul. 5, 1988

[54] FOCUSING LENS

[75] Inventor: Jun Hattori, Yokohama, Japan

[73] Assignee: Canon Kabushiki Kaisha, Tokyo, Japan

[21] Appl. No.: 741,879

[22] Filed: Jun. 6, 1985

[30] Foreign Application Priority Data

Jun. 18, 1984 [JP] Japan ............................ 59-124951

[51] Int. Cl.$^4$ ............................................... G02B 9/04
[52] U.S. Cl. ..................................... 350/413; 350/479; 350/481
[58] Field of Search ......................... 350/413, 479, 481

[56] References Cited

U.S. PATENT DOCUMENTS

| 3,486,808 | 12/1969 | Hamblen ............................ 350/413 |
| 3,626,194 | 12/1971 | Hirano et al. . |
| 3,729,253 | 4/1973 | Moore et al. . |
| 4,457,590 | 7/1984 | Moore . |
| 4,647,159 | 3/1987 | Baba ................................... 350/413 |
| 4,712,882 | 12/1987 | Baba et al. . |

FOREIGN PATENT DOCUMENTS

| 0502264 | 5/1954 | Canada ............................. 350/479 |
| 0014109 | 1/1983 | Japan ................................ 350/481 |
| 0205122 | 11/1983 | Japan ................................ 350/413 |
| 140308 | 7/1985 | Japan . |
| 159817 | 8/1985 | Japan . |
| 163015 | 8/1985 | Japan . |

OTHER PUBLICATIONS

"Design of a Gradient-Index Photographic Device", by Atkinson et al., *Applied Optics*, vol. 21, No. 6, p. 993, 1982.

"Evaluation and Reduction of Aberration in Distributed Index Lenses: A Review", *Applied Optics*, vol. 21, No. 6, p. 1024, 1982.

*Primary Examiner*—John K. Corbin
*Assistant Examiner*—Rebecca D. Gass
*Attorney, Agent, or Firm*—Fitzpatrick, Cella, Harper & Scinto

[57] ABSTRACT

A distributed index of refraction type lens is applied to a focusing lens suitable for a photographing lens to correct various aberrations. One distributed index of refraction type lens and a single-lens (including a bonded lens) of homogeneous medium are combined such that the distributed index of refraction type lens has an index of refraction distribution which continuously decreases as a light goes away from an optical axis, and has a thickness distribution which is smallest on the optical axis of the lens and increases as it goes away from the optical axis. Thus, the aberrations in the whole system can be corrected by the single distributed index of refraction type lens and a light and easy-to-manufacture focusing lens is provided.

14 Claims, 7 Drawing Sheets

FOCUSING LENS

BACKGROUND OF THE INVENTION

1. Field of the Invention

The present invention relates to a focusing lens having a distributed index of refraction type lens, and more particularly to a focusing lens for a photographing lens.

2. Description of the Prior Art

Most of conventional focusing lenses are made of medium having a uniform index of refraction. For example, a photographing standard lens having F-number of 1.8~2 is usually comprised of six lenses of homogeneous medium.

If it can be composed of a smaller number of lenses, work required for making the lens is reduced, a lens holding mechanism is simplified and a chance of introduction of a manufacturing error such as eccentricity is reduced, and hence it is very advantageous. However, in the prior art design which uses the homogeneous medium, it is very difficult to reduce the number of lenses while keeping the optical performance.

Recently, the distributed index of refraction type lens has been introduced as a new optical system and many proposals have been made for the application of this lens to an array lens which is an erected unity-magnification focusing element, and a collimator lens. The application to a photographing lens is reported by Atkinson (Applied Optics, Vol. 21, No. 6, 1982). In this proposal, a standard lens having a half image angle of 21.8° and F-member of 2 is constructed by two distributed index of refraction type lenses. The number of lenses used is significantly smaller than that of the conventional homogeneous lenses. However, the distributed index of refraction type lens is much more complex to manufacture than the homogeneous lens and the use of two or more such lenses is not desirable from the standpoint of cost and mass productivity.

SUMMARY OF THE INVENTION

It is an object of the present invention to provide a focusing lens which is very simple in construction and easy to manufacture and has aberrations well corrected.

The above object of the present invention is achieved by constructing the focusing lens by a distributed index of refraction type single-lens having an index of refraction distribution in which an index of refraction continuously decreases as a light goes away from an optical axis and having a thickness distribution in which a lens thickness is smallest on the optical axis and increases as it goes away from the optical axis, and a single-lens of homogeneous medium having a positive refracting power.

DETAILED DESCRIPTION OF THE PREFERRED EMBODIMENTS

An index of refraction $N(r)$ of a radial gradient lens used as a lens element in the focusing lens of the present invention, in which the index of refraction continuously changes with a distance r from an optical axis is represented by $$N(r) = N_0 + N_1 r^2 + N_2 r^4 + N_3 r^6 + \ldots$$

where $N_0$, $N_1$, $N_2$, $N_3$, ... are constants and r is the distance from the optical axis. The lens element having such an index of refraction distribution has the following characteristics.

(1) The index of refraction distribution itself has a refracting power. Accordingly, a freedom of design in a near-axis area is large.

(2) A contribution of the index of refraction distribution to a petzval sum is smaller than that of a refraction plane having the same refracting power. Accordingly, it is advantageous to present a positive refracting power to the index of refraction distribution in keeping the petzval sum small and correcting an image plane curvature.

(3) It has an aberration correction effect similar to that of a non-spherical surface. The aberrations can be restricted within a predetermined range without affect to near-axis amount by the distribution coefficients. ($N_2$, $N_3$, ...) of fourth order or higher.

(4) It has an achromatic function. Since the wavelength dependency of not only the index of refraction ($N_0$) on the axis but also the distribution coefficients ($N_1$, $N_2$, ...) of second order or higher affect to the chromatic aberration, the chromatic aberration can be controlled by those coefficients.

The present invention utilizes the characteristics of the distributed index of refraction lens, particularly the radial gradient type lens and it is combined with the positive lens having the uniform index of refraction distribution.

It is essential to keep the petzval sum small in order to flatten the image plane, but since the petzval sum is uniquely defined by the power arrangement of the optical system, this must be taken into consideration from a stage of near-axis arrangement in designing the lens. It is a characteristic of the present invention to present a strong positive index of refraction to the index of refraction distribution of the distributed index of refraction type lens and form it into a concave shape in order to allow the correction of the petzval sum with only two lens components.

In a first type of the focusing lens of the present invention, the homogeneous lens is arranged to face an object and the distributed index of refraction type lens is arranged to face the image plane, and in a second type, the distributed index of refraction type lens is arranged to face the object and the homogeneous lens is arranged to face the image plane.

The distributed index of refraction type lens used in the present invention has a concave shape which may be a concave-concave lens, a flat-concave lens or a meniscus lens. Since the homogeneous lens may have any shape and any index of refraction, the lens constructed by the distributed index of refraction type lens and the homogeneous lens may be of various types. The homogeneous lens may be a bonded lens.

In the first type of the lens in which the homogeneous lens is arranged to face the object and the distributed index of refraction type lens arranged to face the image plane, the following conditions should be met to correct the aberration.

$$-0.46 \leq r_3/f \leq -0.33 \ldots \quad (1)$$

$$0.33 \leq d_3/f \leq 0.5 \ldots \quad (2)$$

where f is a focal distance of the whole system, $r_3$ is a radius of curvature of the distributed index of refraction type lens on the surface facing the object, and $d_3$ is a thickness on the axis of the distributed index of refraction type lens.

If $r_3/f$ is smaller than the lower limit of the formula (1), and absolute value of the negative petzval sum on this surface decreases and it is difficult to correct the image plane curvature. If it exceeds the upper limit, a high order spherical aberration and a coma aberration on this surface increase.

If $d_3/f$ is smaller than the lower limit of the formula (2), a gradient of the index of refraction increases and the aberrations increase. Therefore, it is difficult to prepare the medium. If it exceeds the upper limit, the size of the entire system increases and a sufficient back focus is not attained.

In the second type of the lens in which the distributed index of refraction type lens is arranged to face the object and the homogeneous lens is arranged to face the image plane, the following conditions should be met to well correct the aberrations.

$$0.25 \leq r_2/f \leq 0.35 \ldots \quad (3)$$

$$0.27 \leq d_1/f \leq 0.38 \ldots \quad (4)$$

Where $r_2$ is a radius of curvature of the distributed index of refraction type lens on the surface facing the image plane and $d_1$ is a thickness on the axis of the distributed index of refraction type lens.

If $r_2/f$ is smaller than the lower limit of the formula (3), the high order spherical aberration and the coma aberration on this surface increase, and if it is larger than the upper limit, the petzbarrl sum of the whole system increases and it is difficult to correct the image plane curvature.

If $d_1/f$ is smaller than the lower limit of the formula (4), the gradient of the index of refraction increases and the aberration increase. Therefore, it is difficult to prepare the medium. If it is larger than the upper limit, the size of the entire system increases.

Figure 1:
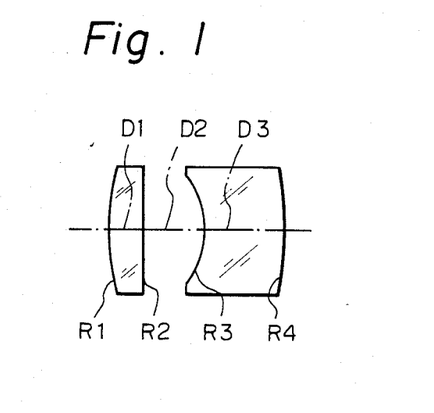
FIG. 1 is a sectional view of one embodiment of a focusing lens of the present invention.
Figure 7:
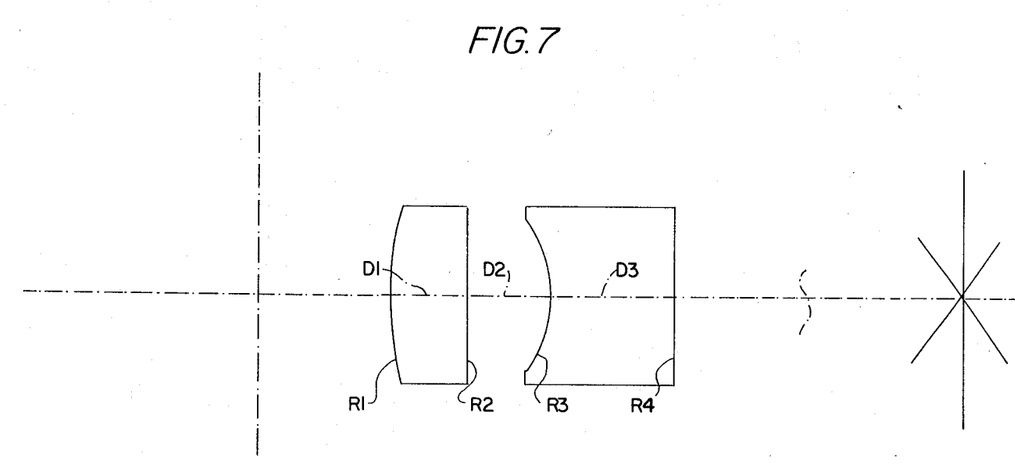
FIG. 7 illustrates a cross-sectional view of the focusing lens defined by Table 1.

Tables 1 to 4 show Examples 1 to 4 of the focusing lens of the present invention. The Examples shown in Tables 1 to 4 are the first types of lenses in which the homogeneous single lens is arranged to face the object and the distributed index of refraction type lens is arranged to face the image plane. FIG. 1 shows the Example 4 as an representative example and shows the sectional view of the lens, while FIG. 7 illustrates a cross-sectional view of the lens defined by Table 1. Ri is a radius of curvature of an i-th lens surface counted from the object, and Di is an axial thickness or an axial air gap between the i-th surface and the (i+1)th surface. In the Tables 1~4, the indices of refraction in the Examples 1 to 3 are those for a d-line, and the indices of refraction in the Example 4 are those for the d-line and g-line.

TABLE 1

| No. | R | D | $N_0$ | $N_1$ | $N_2$ | $N_3$ |
|---|---|---|---|---|---|---|
| 1 | 1.0697 | 0.242 | 1.60311 | | | |
| 2 | 3.6429 | 0.276 | | | | |
| 3 | −0.4161 | 0.412 | 1.71 | −2.8311 | 5.7405 | −10.1789 |
| 4 | 0. | | | | | |

TABLE 2

| No. | R | D | $N_0$ | $N_1$ | $N_2$ | $N_3$ |
|---|---|---|---|---|---|---|
| 1 | 0.9468 | 0.302 | 1.60311 | | | |
| 2 | 3.6868 | 0.367 | | | | |
| 3 | −0.4255 | 0.429 | 1.72 | −2.9762 | 6.7811 | −12.6964 |
| 4 | 3.8765 | | | | | |

TABLE 3

| No. | R | D | $N_0$ | $N_1$ | $N_2$ | $N_3$ |
|---|---|---|---|---|---|---|
| 1 | 1.2170 | 0.063 | 1.7725 | | | |
| 2 | 0.4854 | 0.15 | 1.6223 | | | |
| 3 | 0. | 0.372 | | | | |
| 4 | −0.3994 | 0.437 | 1.75 | −2.6003 | 3.6993 | −5.0368 |
| 5 | −3.5679 | | | | | |

TABLE 4

| No. | R | D | $N_{0d}$ | $N_{0g}$ |
|---|---|---|---|---|
| 1 | 1.2228 | 0.149 | 1.60311 | 1.61539 |
| 2 | 15.1 | 0.297 | | |
| 3 | −0.3962 | 0.368 | 1.75 | 1.77 |
| 4 | −1.8496 | | | |

| | $N_0$ | $N_1$ | $N_2$ | $N_3$ |
|---|---|---|---|---|
| d-line | 1.75 | −2.7086 | 3.9709 | −5.7961 |
| g-line | 1.77 | −2.7398 | 3.9619 | −5.8393 |

In the Examples shown in Tables 1~4, a half image angle is 23 degrees, an F-number is 1.8 and a focal distance is normalized to 1.

In the Example 1, the surface ($R_4$) of the distributed index of refraction type lens facing the image plane is flat. When the medium having an index of refraction distribution is to be finished to have a spherical surface, it must be finished without eccentricity with respect to an axis of symmetry (optical axis) of the index of refraction distribution. It is much more difficult to attain than to work for the conventional homogeneous medium. By making one surface of the lens flat as is done in the Example, the mass productivity is improved.

Figure 2:
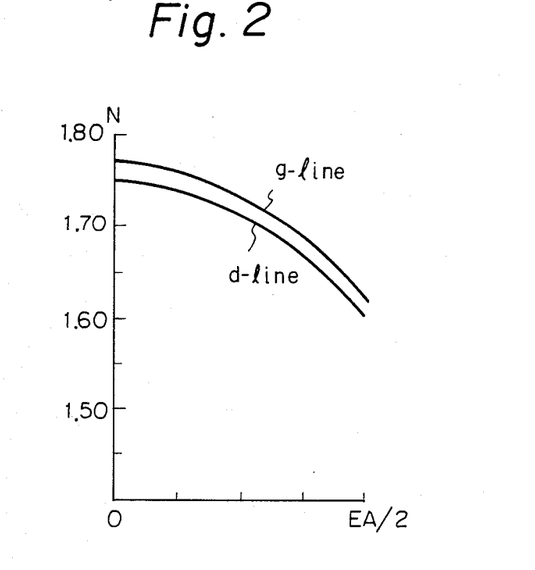
FIG. 2 is an index of refraction distribution of a distributed index of refraction lens used in the focusing lens of FIG. 1.
Figure 3A:
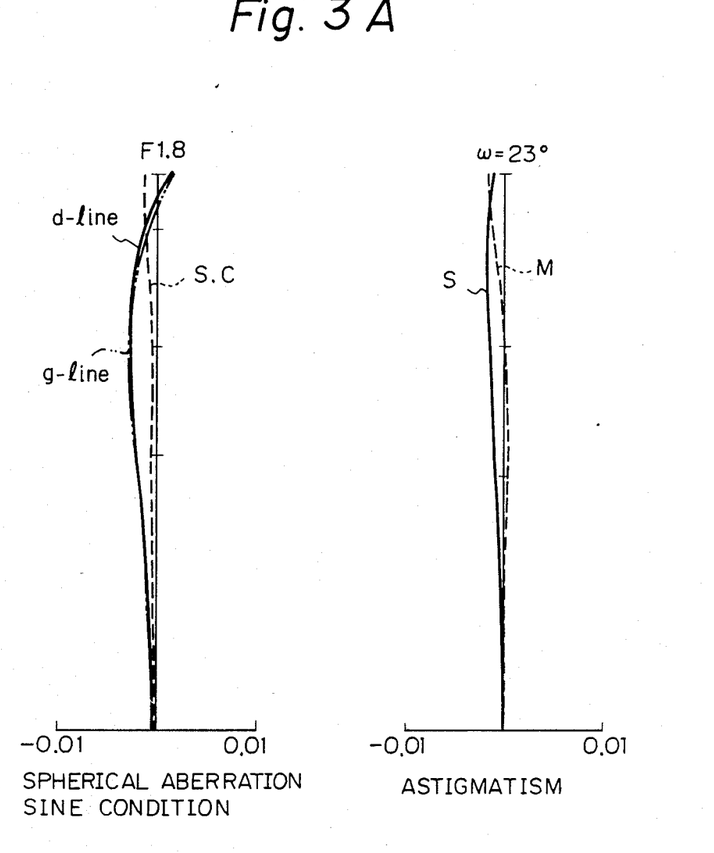
FIG. 3 shows aberrations of the focusing lens shown in FIG. 1.
Figure 3B:
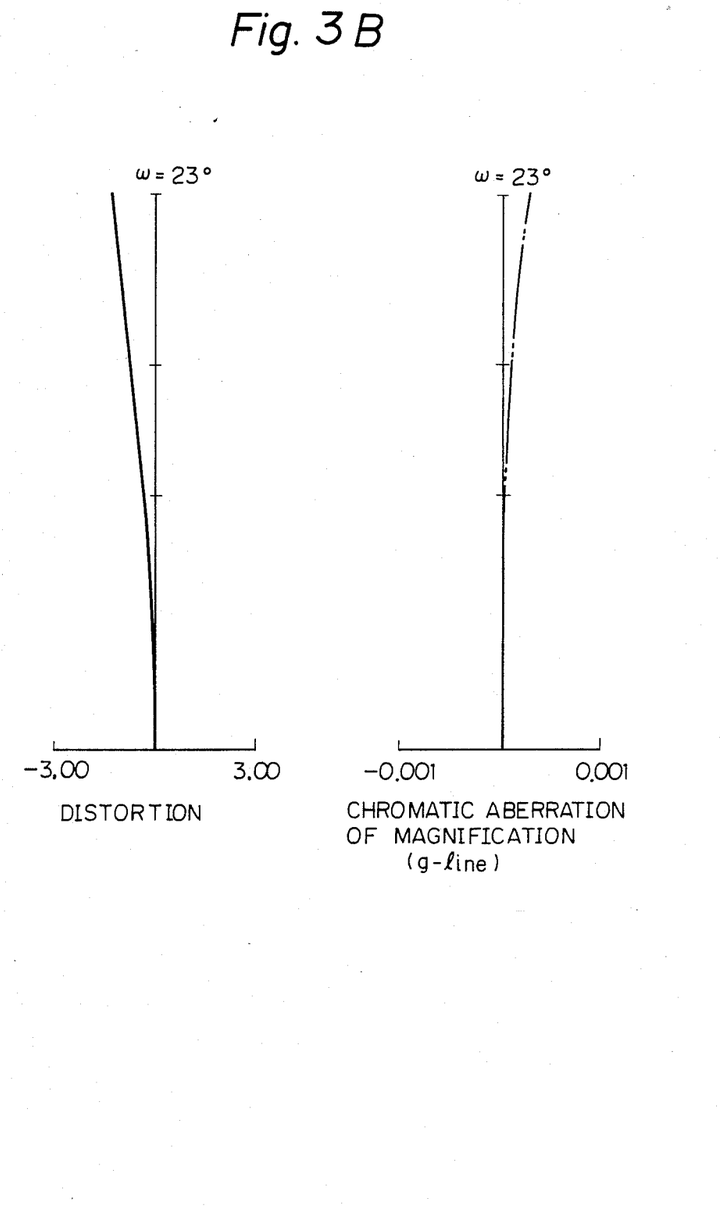

In the Example 3, the homogeneous lens is a bonded lens, and in the Example 4, the chrominance aberration is also corrected. FIG. 2 shows distributions of indices of refraction to the g-line and d-line, of the distributed index of refraction type lens used in the Example 4. In FIG. 2, an ordinate represents the index of refraction N and an abscissa represents a distance from the optical axis. FIG. 3 shows aberrations in the Example 4. FIGS. 2 and 3 demonstrate that the focusing lens of the present invention well corrects the aberrations although it is constructed by only two lens elements.

When the chrominance aberration is corrected by the homogeneous single-lens as is done in the Example 4, an Abbe number $\nu d$ of the medium of the single-lens is preferably $$\nu d \geq 55 \ldots \quad (5)$$

If the Abbe number νd does not meet the formula (5), it is difficult to simultaneously correct the axial chrominance aberration and the magnification chrominance aberration.

Tables 5~7 show Examples 5~7 of the focusing lens of the present invention. Those Examples are the second types of lenses in which the distributed index of refraction type lens is arranged to face the object and the homogeneous lens is arranged to face the image plane. The symbols in the Tables and drawing are identical to those used in the previous Examples.

TABLE 5

| No. | R | D | $N_0$ | $N_1$ | $N_2$ | $N_3$ |
|---|---|---|---|---|---|---|
| 1 | 1.3779 | 0.311 | 1.78 | −3.4776 | 6.0991 | −10.3676 |
| 2 | 0.2962 | 0.307 | | | | |
| 3 | 3.7181 | 0.188 | 1.60311 | | | |
| 4 | −0.8556 | | | | | |

TABLE 6

| No. | R | D | $N_0$ | $N_1$ | $N_2$ | $N_3$ |
|---|---|---|---|---|---|---|
| 1 | 1.4089 | 0.314 | 1.8 | −3.4374 | 5.8643 | −9.6284 |
| 2 | 0.3046 | 0.204 | | | | |
| 3 | 4.2702 | 0.370 | 1.60311 | | | |
| 4 | −0.8314 | | | | | |

TABLE 7

| No. | R | D | $N_{0d}$ | $N_{0g}$ |
|---|---|---|---|---|
| 1 | 1.5479 | 0.337 | 1.8 | 1.82 |
| 2 | 0.2738 | 0.261 | | |
| 3 | 2.5968 | 0.088 | 1.80518 | 1.84706 |
| 4 | 1.0144 | 0.288 | 1.60311 | 1.61539 |
| 5 | −0.6550 | | | |

| | $N_0$ | $N_1$ | $N_2$ | $N_3$ |
|---|---|---|---|---|
| d-line | 1.8 | −3.5013 | 6.0999 | −10.4683 |
| g-line | 1.82 | −3.5586 | 6.1315 | −9.6043 |

Figure 4:
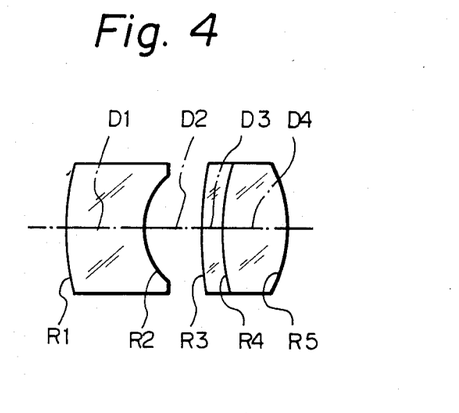
FIG. 4 is a sectional view of another embodiment of the focusing lens of the present invention.
Figure 5:
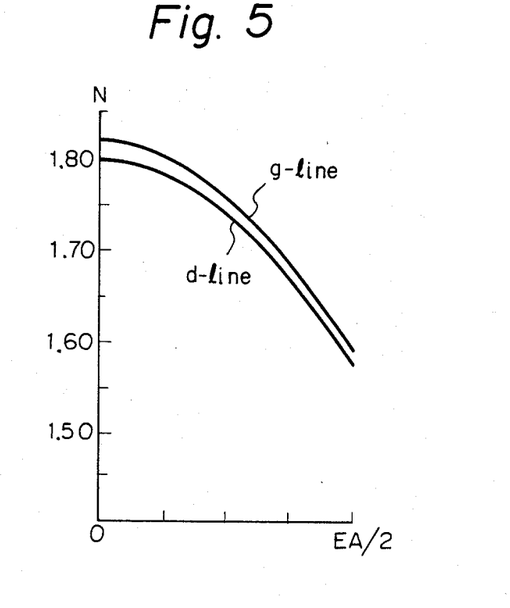
FIG. 5 shows an index of refraction distribution of a distributed index of refraction type lens used in the focusing lens of FIG. 4.
Figure 6A:
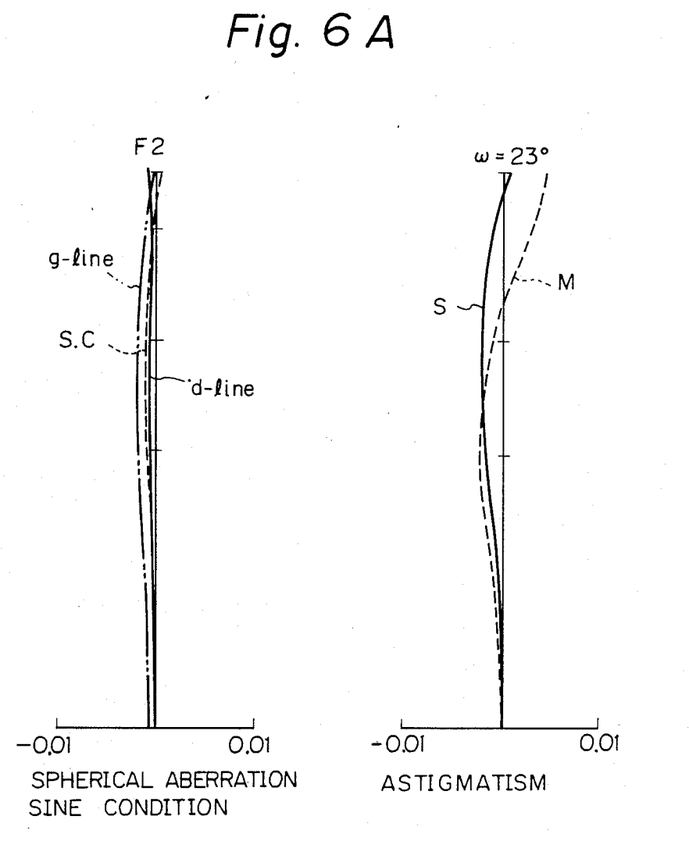
FIG. 6 illustrates aberrations of the focusing lens shown in FIG. 4.
Figure 6B:
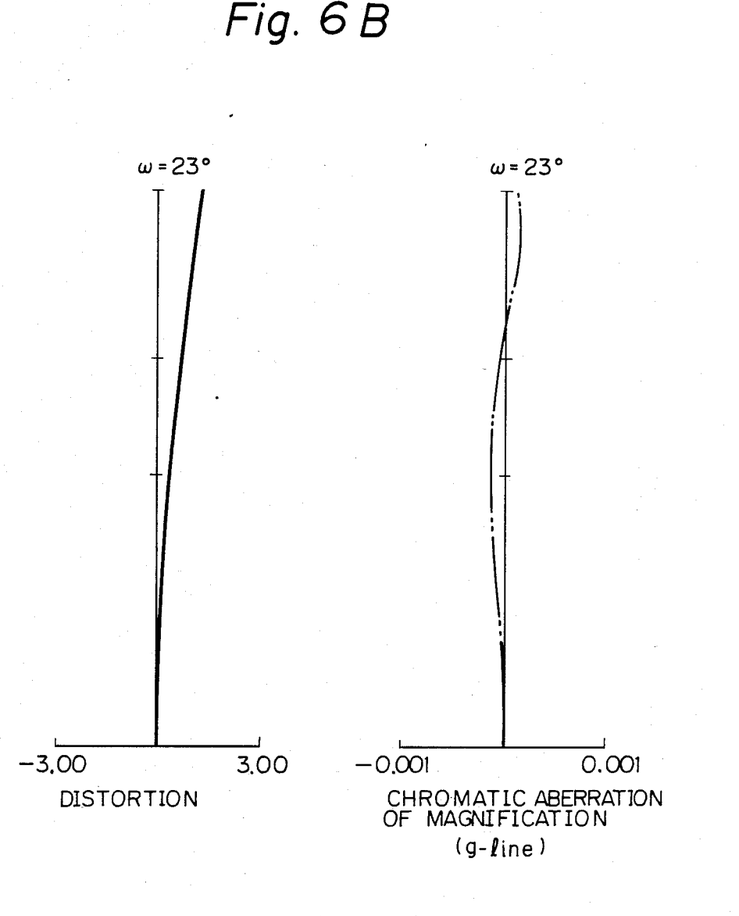

The Examples 5 and 6 show the index of refraction distributions for the d-line, and the Example 7 shows the index of refraction distribution for the d-line and g-line. FIG. 4 shows a sectional view of the lens of the Example 7 as a representative example of the second type of lens, FIG. 5 shows index of refraction distributions for the d-line and g-line, of the distributed index of refraction type lens used in the Example 7, and FIG. 6 shows aberrations in the Example 7.

The homogeneous lens in the Example 7 is a bonded lens of a convex lens and a concave lens. The chrominance aberration is corrected by bonding the lenses. The Abbe number $\nu d_p$ of the convex lens and the abbe number $\nu d_N$ of the concave lens of the bonded lens preferably meets the following condition.

$$\nu d_p - \nu d_N \geq 25 \ldots \quad (6)$$

If $\nu d_p - \nu d_N$ is smaller than the above limit, it is difficult to simultaneously correct the axial chrominance aberration and the magnification chrominance aberration.

The power of each of the distributed index of refraction type lenses defined by Tables 1-7 is positive.

Table 8 shows aberration coefficients in the Example 1~7. Third order spherical aberration coefficient I for an indifinite object distance, coma aberration coefficient II, astigmatism coefficient III, petzval sum P, and distortion aberration coefficient V are shown. For the Examples 4 and 7, axial chrominance aberration L and magnification chrominance aberration T are also shown. As seen from Table 8, the present focusing lens effectively utilizes the characteristic of the distributed index of refraction type lens and corrects the spherical aberration, coma aberration, astigmatism, distortion aberration, image plane curvature, and chrominance aberration by only two lens elements. Since only one distributed index of refraction type lens is used, the focusing lens is small in size and easy to manufacture, assemble and adjust. The single-lens in the present invention may include the bonded lens.

TABLE 8

| | I | II | III | P | V | L | T |
|---|---|---|---|---|---|---|---|
| Example 1 | 0.222 | −0.108 | −0.017 | 0.048 | 0.278 | | |
| Example 2 | 0.216 | −0.078 | 0.012 | 0.066 | 0.095 | | |
| Example 3 | 0.197 | −0.051 | −0.026 | 0.041 | 0.239 | | |
| Example 4 | 0.279 | −0.121 | −0.059 | 0.084 | 0.190 | $2.08 \times 10^{-4}$ | $1.2 \times 10^{-5}$ |
| Example 5 | 0.024 | 0.026 | 0.051 | 0.061 | −0.287 | | |
| Example 6 | 0.010 | 0.082 | 0.025 | 0.064 | −0.191 | | |
| Example 7 | 0.113 | 0.029 | 0.020 | 0.070 | −0.191 | $5.72 \times 10^{-4}$ | $7.80 \times 10^{-5}$ |

What is claimed is:

1. A focusing lens comprising:
    a distributed index of refraction type single-lens with an index of refraction continuously decreasing with a distance from an optical axis, said lens having a smallest thickness on the optical axis and the thickness increasing with the distance from the optical axis; and a single-lens of homogeneous medium having a positive refracting power.

2. A focusing lens according to claim 1, wherein said single-lens of homogeneous medium is arranged to face an object and said distributed index of refraction type single-lens is arranged to face an image plane.

3. A focusing lens according to claim 2, wherein said distributed index of refraction type single-lens meets the following conditions;

$$-0.46 \leq r_3/f \leq -0.33$$

$$0.33 \leq d_3/f \leq 0.5$$

where f is a focal distance of the entire system, $r_3$ is a radius of curvature of said distributed index of refraction type single-lens on a surface facing the object, and $d_3$ is an axial thickness of said distributed index of refraction type single-lens.

4. A focusing lens according to claim 2, wherein said single-lens is a bonded lens.

5. A focusing lens according to claim 2, wherein said homogeneous single-lens corrects a chrominance aberration and has an abbe number νd of no smaller than 55.

6. A focusing lens according to claim 1, wherein said distributed index of refraction type single-lens is arranged to face an object and said homogeneous single-lens is arranged to face the image plane.

7. A focusing lens according to claim 6, wherein said distributed index of refraction type single-lens meets the following conditions;

$$0.25 \leq r_2/f \leq 0.35$$

$$0.27 \leq d_1/f \leq 0.38$$

where f is a focal distance of an entire system, $r_2$ is a radius of curvature of said distributed index of refraction type single-lens on the surface facing the image plane, and $d_1$ is an axial thickness of said distributed index of refraction type single-lens.

8. A focusing lens according to claim 6, wherein said homogeneous single-lens corrects a chrominance aberration and is a bonded lens constructed by a convex lens having an abbe number $\nu d_p$ and a concave lens having an abbe number of $\nu d_N$, where $\nu d_p - \nu d_N \geq 25$.

9. A focusing lens according to claim 1, wherein one plane of said distributed index of refraction type single-lens is planar.

10. A focusing lens comprising:
a distributed index lens having an optical axis and being arranged to face an image, wherein said lens has a refractive index which decreases as the distance from said optical axis increases and wherein said lens has its smallest thickness on said optical axis, which thickness increases as the distance from said optical axis increases, said lens; and
a positive lens arranged to face an object;
wherein said distributed index lens satisfies the following conditions:

$$-0.46 \leq r_3/f \leq -0.33$$

$$0.33 \leq d_3/f \leq 0.5$$

where f is the focal distance of said focusing lens, $r_3$ is the radius of curvature of said distributed index lens on a surface thereof facing the object, and $d_3$ is the thickness of said distributed index lens on said optical axis.

11. A focusing lens comprising:
a distributed index lens having an optical axis and being arranged to face an object, wherein said lens has a refractive index which decreases as the distance from said optical axis increases and wherein said lens has its smallest thickness on said optical axis which the thickness increases as the distance from said optical axis increases; and
a positive lens arranged to face an image;
wherein said distributed index lens satisfies the following conditions:

$$0.25 \leq r_2/f \leq 0.35$$

$$0.27 \leq d_1/f \leq 0.38$$

where f is the focal distance of said focusing lens, $r_2$ is the radius of curvature of said distributed index lens on a surface thereof facing the image, and $d_1$ is the thickness of said distributed index lens on said optical axis.

12. A focusing lens comprising:
a distributed index lens having a distributed index of a positive refracting power, said distributed index lens having a concave surface; and
a positive lens of a homogeneous medium, said positive lens being arranged to face said concave surface of said distributed index lens.

13. A focusing lens according to claim 12, wherein said distributed index lens is arranged to face an image plane, wherein said positive lens is arranged to face an object, and wherein said focusing lens satisfies the following conditions;

$$-0.46 \leq r_3/f \leq -0.33$$

$$0.33 \leq d_3/f \leq 0.5$$

where f is a focal length of said focusing lens, $r_3$ is the radius of curvature of said concave surface of said distributed index lens, and $d_3$ is the axial thickness of said distributed index lens.

14. A focusing lens according to claim 12, wherein said distributed index lens is arranged to face an object, wherein said positive lens is arranged to face an image plane, and wherein said focusing lens satisfies the following conditions:

$$0.25 \leq r_2/f \leq 0.35$$

$$0.27 \leq d_1/f \leq 0.38$$

wherein f is a focal length of said focusing lens, $r_2$ is the radius of curvature of said concave surface of said distributed index lens, and $d_1$ is the axial thickness of said distributed index lens.

* * * * *

UNITED STATES PATENT AND TRADEMARK OFFICE
CERTIFICATE OF CORRECTION

PATENT NO. : 4,755,039            Page 1 of 2

DATED : July 5, 1988

INVENTOR(S) : Jun Hattori

It is certified that error appears in the above-identified patent and that said Letters Patent is hereby corrected as shown below:

IN THE ABSTRACT AT [56]

""Design of a Gradient-Index Photographic Device"," should read --"Design of a Gradient-Index Photographic Objective,"--.

COLUMN 1

Line 31, "F-member" should read --F-number--.
Line 60, "refraction lens" should read --refraction type lens--.
Line 68, "FIG. 4," should read --FIG. 4;--.

COLUMN 2

Line 33, delete "to".
Line 34, "ents." should read --ents--.
Line 38, "delete "to".

COLUMN 3

Line 47, "petzbarrl" should read --petzval--.
Line 52, "aberration" should read --aberrations--.
Line 62, "an" should read --a--.

COLUMN 5

Line 53, "distribution" should read --distributions--.

UNITED STATES PATENT AND TRADEMARK OFFICE
CERTIFICATE OF CORRECTION

PATENT NO. : 4,755,039

DATED : July 5, 1988

INVENTOR(S) : Jun Hattori

It is certified that error appears in the above-identified patent and that said Letters Patent is hereby corrected as shown below:

COLUMN 6

Line 6, "Example" should read --Examples--.
    Line 8, "indifinite" should read --indefinite--.
    Line 49, "conditions;" should read --conditions:--.

COLUMN 7

Line 3, "conditions;" should read --conditions:--.
    Line 30, "increases, said lens; and" should read
        --increases, and said lens being arranged
        to face an object; and--.

CLAIM 8

Line 1, "axis which" should read --axis, which--.
    Line 26, "conditions;" should read --conditions:--.
    Line 46, "wherein" should read --where--.

Signed and Sealed this

Twenty-first Day of March, 1989

Attest:

DONALD J. QUIGG

*Attesting Officer*        *Commissioner of Patents and Trademarks*